D. G. MACPHERSON.
MOTOR CAR BRAKE.
APPLICATION FILED JAN. 7, 1921.

1,426,753

Patented Aug. 22, 1922.

Inventor.
Douglas G. Macpherson
by H. J. S. Dennison
Atty.

UNITED STATES PATENT OFFICE.

DOUGLAS G. MACPHERSON, OF PORTAGE LA PRAIRIE, MANITOBA, CANADA.

MOTOR-CAR BRAKE.

1,426,753.  Specification of Letters Patent.  Patented Aug. 22, 1922.

Application filed January 7, 1921. Serial No. 435,696.

*To all whom it may concern:*

Be it known that I, DOUGLAS G. MACPHERSON, a subject of the King of Great Britain, and resident of the city of Portage la Prairie, Province of Manitoba, in the Dominion of Canada, have invented certain new and useful Improvements in Motor-Car Brakes, as described in the following specification and illustrated in the accompanying drawings.

The principal objects of this invention are, to facilitate the inspection, adjustment and repair of the braking elements, thereby enhancing the safety conditions and to devise a brake construction which will relieve the rear axle housing of braking torque and will obviate the fouling of the braking elements with lubricant.

A still further object is to allow a greater latitude of design of spring anchorage.

The principal feature of the invention consists in the novel construction and arrangement of parts whereby the brakes are arranged on the outer side of the wheels.

In the drawings, Figure 1 is a side elevational view of the rear wheel of a car showing the application of this invention.

Figure 1:
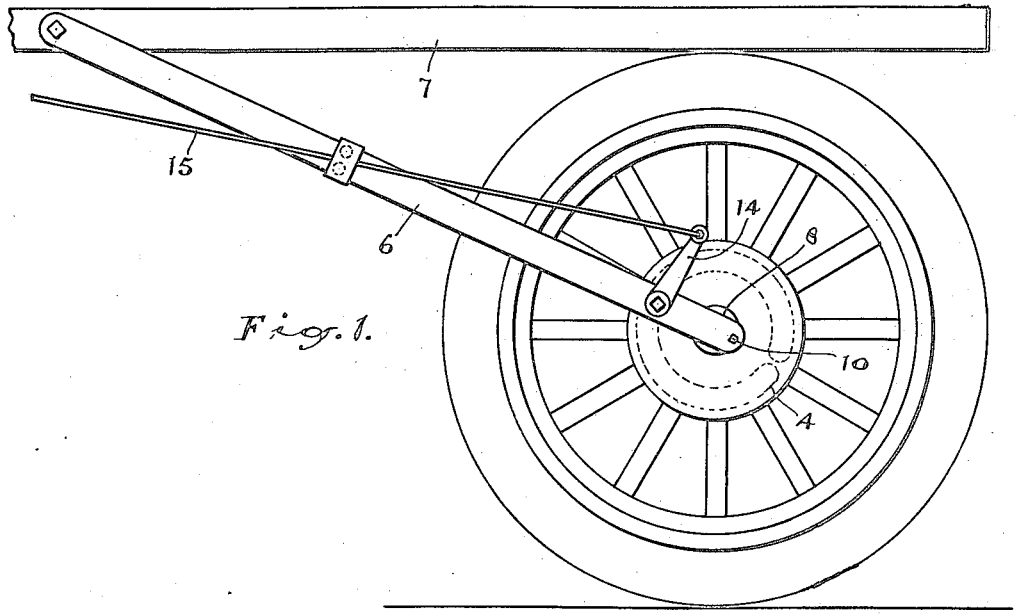
Figure 2:
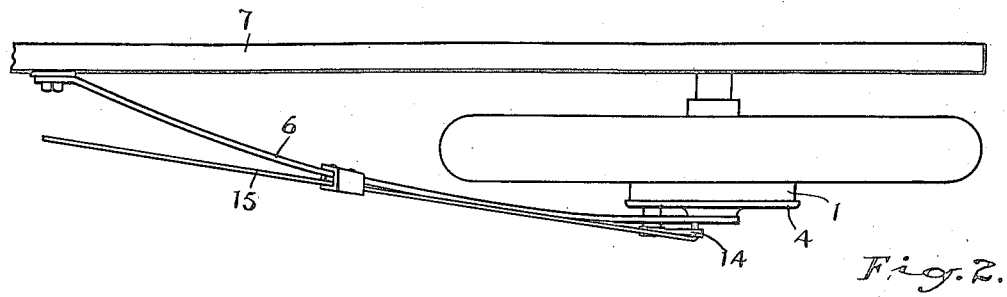
Figure 2 is a plan view.
Figure 3:
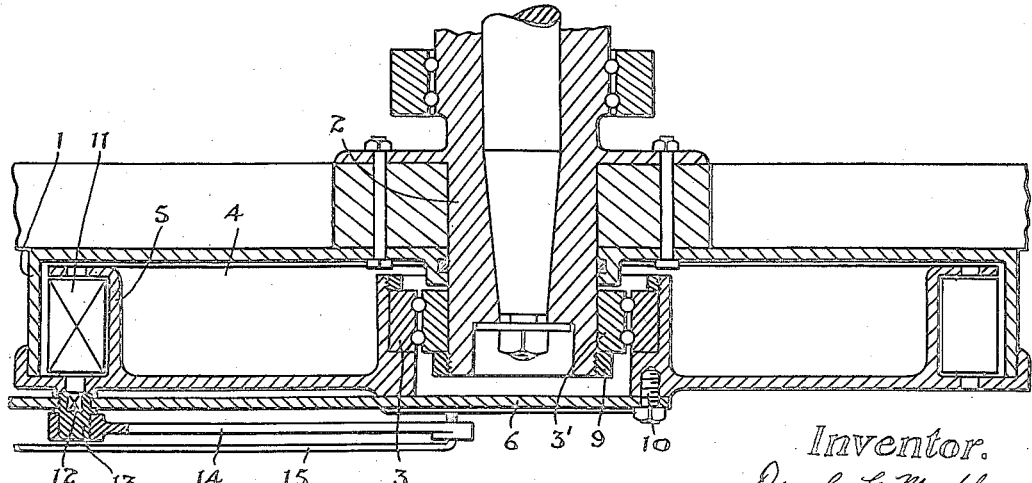
Figure 3 is an enlarged sectional view through the hub structure of the wheel showing the application of my invention.

In the ordinary construction of brakes on motor vehicles the braking mechanism is arranged in a very restricted space between the wheel and the spring and it is very difficult of access and frequently requires the removal of the wheel to make adjustments.

According to the present invention the brake drum 1 is arranged on the outer side of the wheel and the wheel hub 2 is projected to carry the anti-friction bearing 3. Upon this bearing is mounted a drum 4 which is provided with a flanged rim 5 extending within the drum 1 and carries suitable brake shoes of the expanding type which are adapted to engage the inner peripheral surface of the drum flange 1. The drum 4 is held from rotation by a radius bar 6 which is pivotally secured to the car frame 7 at a point about mid-way of its length, said bar being bedded in a transverse groove 8 in the outer side of the drum 4.

The drum 4 is held in place by the lock ring 9 threaded on the outer end of the hub engaging the inner bearing ring 3 and upon the removal of this member the shoe drum 4 may be lifted out.

The radius bar is readily detachable without disturbing the brake shoe drum it being held in the retaining groove 8 by a suitable locking bolt 10.

The brake shoes are here shown operated by a squared member 11 journalled between the flanges of the shoe drum and having a squared stem 12 projecting through the face. The radius bar carries a rotatable socket member 13 which fits over the squared stem of the brake operating member 11 and this is operated by the brake arm 14 secured on the outer side to which the operating rod or cable 15 is connected.

The construction described is extremely simple, the braking member is centrally supported on the wheel hub and held from rotation by the radius bar which also forms the torque anchor.

When it is desired to remove the tire, the torque bar may be released and swung out of the way and when it is desired to adjust the brake or renew the linings it is merely necessary to remove the retaining ring and withdraw the shoe drum.

The two drums enclose the shoes within a dust proof casing which will greatly enhance their braking value and as the whole brake mechanism is on the outer side of the wheel it will be free from oil and grease and may be readily kept clean.

What I claim as my invention is:—

1. A motor car brake, comprising, a brake drum secured to the outer side of the wheel, a brake supporting member rotatably mounted on the wheel, and means for holding said brake supporting member from rotation.

2. A motor car brake, comprising, a brake drum secured to the outer side of the wheel, a brake supporting member rotatably mounted on the wheel, and a rod secured to said brake supporting member and pivotally connected to the frame.

3. A motor car brake, comprising, a brake drum secured to the outer side of the wheel, an anti-friction bearing arranged on the outer end of the wheel hub, a shoe drum rotatably mounted on said bearing, means for anchoring said shoe drum from rotation, brake shoes carried by said shoe drum, and means for operating said shoes.

4. A motor car brake, comprising a brake drum secured to the outer side of the wheel, a brake shoe drum rotatably mounted axially of said brake drum, having a flange projecting inwardly within the brake drum, brake shoes mounted on said shoe drum flange, anchor means for holding said shoe drum from rotation, and means carried by said anchor means for operating said brake shoes.

5. A motor car brake, comprising, a brake drum secured to the outer side of the wheel, a brake shoe drum rotatably mounted axially of said brake drum, means for detachably securing said brake shoe drum in place, means for anchoring said brake shoe drum from rotation, brake shoes supported on said brake shoe drum and engaging the brake drum, and means carried by said anchor means for operating said brake shoes.

DOUGLAS G. MACPHERSON.